Oct. 6, 1964  W. P. MURPHY, JR  3,152,202
MANUFACTURE OF TAPERED END PLASTIC TUBES
Filed Dec. 30, 1960
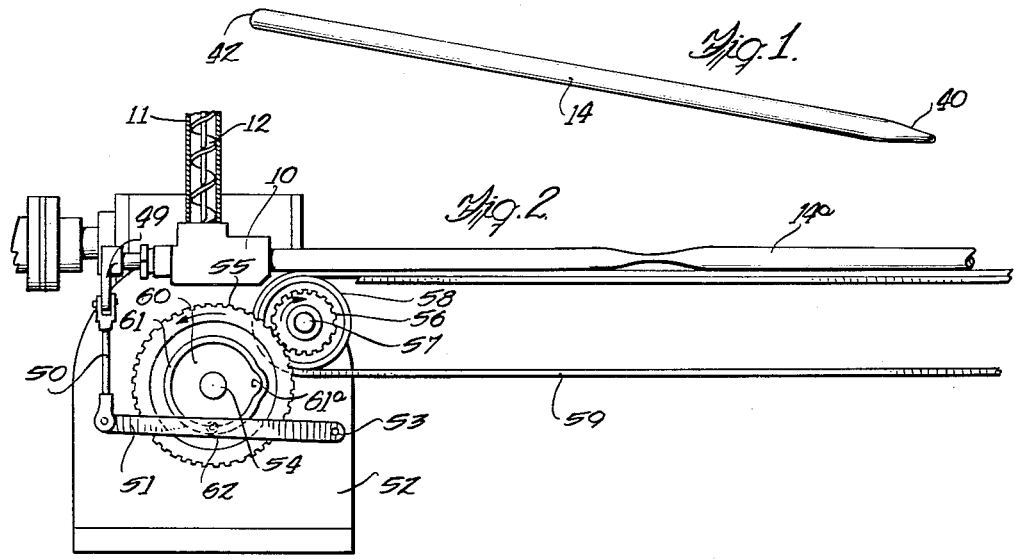
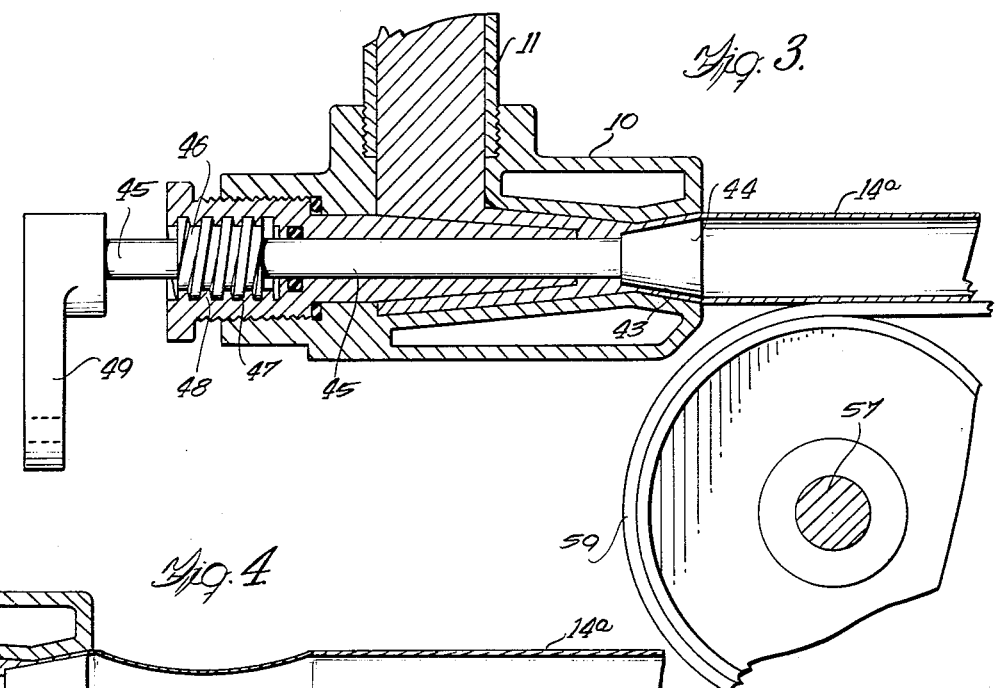
Inventor
William P. Murphy Jr.
Dawson, Tilton, Fallon & Lungmus
Attorneys

3,152,202
MANUFACTURE OF TAPERED END PLASTIC TUBES
William P. Murphy, Jr., Miami, Fla., assignor to Dade Reagents, Inc., Miami, Fla., a corporation of Florida
Filed Dec. 30, 1960, Ser. No. 79,601
3 Claims. (Cl. 264—167)

This invention relates to the manufacture of tapered end plastic tubes, and more particularly to a method for continuously producing plastic tubes having narrowed or tapered ends during the extuding of the tubes.

An object of the invention is to provide a method for continuously producing tapered end plastic tubes wherein the plastic condition of the tubes, when extruded, is utilized with correlated operations for tapering the tubes at selected distances and then severing the tubes at the points of narrowing or constriction to produce the final product. Another object is to provide methods for effecting the narrowing of a continuously extruded tube at spaced distances to provide a taper, whereby, upon the severing of the tubes at the points of taper, completed tubes such as dropper-type pipettes, and the like, are produced. A still further object is to provide a continuous method for producing tapered tubes at low cost and in large volume through the utilization of mechanism and steps for narrowing the tubes as they are formed in the extrusion operation. Other specific objects and advantages will appear as the specification proceeds.

The invention is shown, in illustrative embodiments, by the accompanying drawings, in which—

FIGURE 1 is a perspective view of a plastic tube formed in accordance with my invention; FIG. 2, a broken side view in elevation of apparatus which may be employed in carrying out my invention; FIG. 3, an enlarged sectional view of the extruding mechanism shown in FIG. 2; and FIG. 4, a broken sectional view similar to FIG. 3 but showing the extruding cone valve in a different position from that shown in FIG. 3.

In FIGURE 1, there is illustrated a severed tube 14 having a tapered end portion 40 and at its rear an open end 42. Such a plastic tube is useful as a pipette of the dropper-type, or for many other uses, and by the continuous extruding mechanism illustrated in FIGURES 2–4, such tubes may be formed in large volume and in an automatic manner.

In the illustration given in FIGS. 2–4, inclusive, I provide extrusion apparatus equipped with means for suddenly diminishing the amount of plastic resin discharged, with the result that the thin walls of the discharged tube attenuate and form a constriction even though the conveyor is driven constantly at a uniform speed.

Extruder 10 is provided with a vertical chamber 11, a conventional extrusion screw 12, and a flared discharge cone end 43, in which is mounted a cone valve 44. The forward or rearward movement of the cone valve 44 controls the thickness of the discharged tube 14a. In the illustration given, I provide mechanism for reciprocating the cone valve 44 at spaced intervals to affect the thicknes of the extruded tube. This mechanism may be described as follows:

The cone valve 44 is provided with a shaft 45 provided at its rear with an enlarged portion 46 equipped with a worm 47 meshing with grooves mounted in the packing nut 48. The shaft 45 is fixed at its end to a lever 49 pivotally connected to a rod 50 which in turn is pivotally connected to a rock-shaft 51, the shaft 51 being pivoted to the casing 52 at 53. A drive shaft 54 is provided with a gear 55 meshing with a gear 56 carried by shaft 57, on which is mounted a drum 58. The drum 58 carries the continuous conveyor belt 59.

Also mounted upon the shaft 54 is a cam disk 60 having a cam groove 61 engaged by a roller follower 62 carried by the lever 51.

In operation, the shaft 54, driven by a motor or other source of power, continuously rotates, and through gears 55 and 56 drives the shaft 57 to move drum 58 and the top reach of the conveyor belt 59 in a forward direction away from the extruder 10. At the same time, through the cam 61 and cam follower 62, lever 51 is moved in a circular path until the cam portion 61a is reached, and at this point a sudden rocking of the shaft 51 takes place, rotating lever 49 and shaft 45 to cause an inward movement of the cone valve 44 from the position shown in FIG. 3 to the position shown in FIG. 4. When the cone valve 44 is in the position shown in FIG. 3, the plastic tube 14a is of sufficient thickness to resist attenuation, but when the cone valve 44 is in the retracted position shown in FIG. 4, the walls of the tube are greatly reduced in thickness and under the drawing action of the conveyor 59, the tube is attenuated as indicated at 63 to form the desired constriction or narrowing.

The sudden diminution of the feed material at the point of extrusion can be effected not only by a valve 44, as illustrated in FIGS. 2–4, but may also be effected by the intermittent operation of the screw 12 in the extrusion cylinder 11, illustrated in FIG. 2. Through the use of a variable speed motor or variable cam mechanisms of any suitable type, the screw shaft 12 may be operated at a uniform speed and then at lesser speeds periodically, whereby the extruded tube has spaced thinner-walled sections that yield to form the attenuated areas just as has been described in connection with the embodiment shown in FIGS. 2–4, inclusive.

It will be understood that other means and method steps may be employed for utilizing the plastic character of the tube as it is extruded for forming the periodic attenuations or constrictions, and that in coordinated relation therewith, the discharged tube may be severed to form separate tubes having tapered end portions. The process and apparatus provide an extremely rapid and continuous method of forming the tubes and discharging them in finished condition.

While, in the foregoing specification, I have set forth specific mechanism in considerable detail and method procedure in detail, it will be understood that such details of structure and procedure may be varied widely by those skilled in the art without departing from the spirit of my invention.

I claim:
1. In the production of plastic tubes having reduced end portions, the steps of continuously extruding a plastic tube through an extrusion orifice, drawing the extruded tube at a substantially uniform rate from said orifice, and periodically and uniformly reducing the amount of plastic material passing through said orifice about the entire periphery thereof to form evenly spaced tubular portions of reduced diameter.

2. In the production of plastic tubes having reduced end portions, the steps of continuously extruding a plastic tube through an extrusion orifice, drawing the extruded tube at a substantially uniform rate from said orifice, and periodically and uniformly reducing the amount of plastic material passing through said orifice about the entire periphery thereof by periodically and uniformly reducing the cross sectional area of the extrusion orifice without substantially reducing the maximum diameter thereof, thereby forming a plastic tube having evenly spaced portions of reduced diameter.

3. In the production of plastic tubes having reduced end portions, the steps of continuously extruding a plastic tube through an extrusion orifice, drawing the extruded tube at a substantially uniform rate from said orifice, and periodically and uniformly reducing the amount of plastic material passing through said orifice about the entire periphery thereof by periodically and uniformly reducing the pressure upon the material being extruded, thereby forming a plastic tube having evenly spaced portions of reduced diameter.

References Cited in the file of this patent

UNITED STATES PATENTS

| | | |
|---|---|---|
| 2,044,961 | Waner | June 23, 1936 |
| 2,057,467 | Williams | Oct. 13, 1936 |
| 2,940,126 | Sheridan | June 14, 1960 |
| 2,958,160 | Cooke et al. | Nov. 1, 1960 |

FOREIGN PATENTS

| | | |
|---|---|---|
| 1,029,586 | France | June 3, 1953 |